United States Patent [19]

Yoshimura et al.

[11] Patent Number: 4,693,879
[45] Date of Patent: Sep. 15, 1987

[54] ULTRASONIC VIBRATION SIEVING APPARATUS AND PROCESS FOR PURIFYING CARBON BLACK BY USING THE APPARATUS

[75] Inventors: Shushichi Yoshimura; Yasunori Hiwatashi; Hiromu Kobayashi; Hozo Yamazaki, all of Kitakyushu; Nobu Nishino, Iwaki; Teruji Tahara, Yokohama; Hidenobu Kobayashi, Kitakyushu, all of Japan

[73] Assignee: Mitsubishi Chemical Industries Ltd., Tokyo, Japan

[21] Appl. No.: 785,680

[22] Filed: Oct. 9, 1985

[30] Foreign Application Priority Data

Oct. 9, 1984 [JP] Japan .................................. 59-212147
Dec. 26, 1984 [JP] Japan .................................. 59-280578
Dec. 26, 1984 [JP] Japan .................................. 59-280579

[51] Int. Cl.$^4$ .............................................. C09C 1/56
[52] U.S. Cl. ................................... 423/461; 209/270; 209/379; 210/748; 210/785
[58] Field of Search ............... 210/748, 785, 791, 384, 210/388; 209/17, 268, 270, 273, 379; 423/461

[56] References Cited

U.S. PATENT DOCUMENTS 3,490,584 1/1970 Balamuth ............................ 210/748

FOREIGN PATENT DOCUMENTS 11963 2/1981 Japan .

Primary Examiner—Andres Kashnikow
Attorney, Agent, or Firm—Oblon, Fisher, Spivak, McClelland & Maier

[57] ABSTRACT

A process for purifying carbon black which contains solid impurities by removing the solid impurities therefrom, which process comprises suspending said carbon black uniformly in water to obtain a carbon black aqueous slurry and subjecting the slurry to sieving treatment by an ultrasonic vibration sieving apparatus.

15 Claims, 3 Drawing Figures

ULTRASONIC VIBRATION SIEVING APPARATUS AND PROCESS FOR PURIFYING CARBON BLACK BY USING THE APPARATUS

BACKGROUND OF THE INVENTION

1. Field of the Invention

The present invention relates to an ultrasonic vibration sieving apparatus and a method for purifying carbon black which contains solid impurities by removing the solid impurities therefrom by using the ultrasonic vibration sieving apparatus. More specifically, the present invention relates to an ultrasonic vibration sieving apparatus and a process for purifying carbon black by removing water insoluble and water soluble impurities contained in the carbon black such as furnace black produced by an oil furnace type reaction furnace, by-product carbon black formed in a partial oxidation furnace of a heavy oil and pyrolytic carbon black formed by the pyrolysis of a gas.

2. Description of the Prior Art

Carbon black is commonly widely used as a pigment for a resin, paint or ink, as a reinforcing material for rubber, or as an electric conductivity-imparting material for a resin, rubber or ink.

When carbon black is to be incorporated directly into a thermoplastic resin or rubber, it is common to employ a Bumbury's mixer, a mixing roll mill, a Henschel mixer, a pressure kneader, a screw type extruder or the like. For the incorporation into a paint or ink, carbon black is added at the same time as, or after a thermoplastic or thermosetting resin or rubber is dissolved in a solvent, and the mixture is blended in a sand mill or a ball mill.

In recent years, it has been common to employ a mass-coloring method in which carbon black is incorporated to a monomer and thoroughly dispersed therein, followed by filming or spinning.

However, a number of troubles have been caused by solid impurities or foreign matters contained in the carbon black. For instance, during the kneading or molding of the resin or rubber by an extruder, such solid impurities or foreign matters cause clogging of the screen in front of the breaker plate of the extruder. Unusual wearing off is caused at the portion of the spinning machine which is in contact with filaments span after the mass-coloring, whereby the production efficiency substantially deteriorates. Further, small protrusions attributable to the solid impurities are likely to form on the surface of an extrusion-molded product, an inflation molded product or a press molded product, or scars are likely to be formed on the suface of a press-molding die, or breakage of filaments is likely to be caused during the spinning after the mass-coloring, whereby the commercial values of the products will be substantially impaired.

If carbon black contains water soluble solid impurities composed of an alkali metal salt or an alkaline earth metal salt, there will be a serious trouble such that when such carbon black is incorporated to a resin and applied to the surface of a high density recording material, the nature of the treated surface of the high density recording information material will be changed.

In order to separate and remove such solid impurities from carbon black, it has been common to employ a method wherein a mechanical separation means such as a sieve or cyclone is used depending upon the type and the particle size of the impurities, or a method wherein carbon black is formed into an aqueous slurry, and then sieved by means of a mechanical vibration sieve, as disclosed in Japanese Unexamined Patent Publication No. 11963/1981.

However, according to the above-mentioned methods, the ability for the removal of the solid impurities is limited to a level of from $10^{-2}$ to $10^{-3}$ % at best, at a particle size of 44 $\mu$m on the sieve. With such a removal rate, it is practically impossible to prevent the clogging of the screen of the extruder or to prevent the deterioration of the surface texture of the molded products. It is totally impossible to prevent the deformation of the treated surface of a shaped resin product such as the information material due to the impurities composed of an alkali metal salt or an alkaline earth metal salt.

Further, in the case of the latter method, coagulated carbon black will remain on the sieve, and it will be necessary to remove the coagulated carbon black, whereby it will be difficult to conduct the treatment in a continuous process.

SUMMARY OF THE INVENTION

Under the circumstances, the present inventors have conducted extensive researches with an aim to solve the above-mentioned problems and to remove the solid impurities from carbon black as far as possible. As a result, it has been found that when carbon black is uniformly suspended in water and then this suspension is passed through a sieve while applying ultrasonic waves to the suspension, it is possible to remove fine solid impurities which were hardly removable by the conventional methods, and it is also possible to conduct the treatment continuously for a long period of time. Further, it has been found possible to prevent the loss of energy, and to provide a large size ultrasonic sieving apparatus which is durable for continuous operation for a long period of time by rotating the filter layer and by dipping only the lower end portion of the ultrasonic oscillation tip into an aqueous slurry of carbon black. The present invention is based on these discoveries.

An object of the present invention is to provide an ultrasonic vibration sieving apparatus for removing solid impurities from a slurry which contains flocculable fine particles and solid impurities, such as an aqueous slurry of carbon black.

Another object of the present invention is to provide an industrially advantageous process for purifying carbon black by removing fine solid impurities from the aqueous slurry of carbon black.

Namely, the present invention provides a process for purifying carbon black which contains solid impurities by removing the solid impurities therefrom, which process comprises suspending said carbon black uniformly in water to obtain a carbon black aqueous slurry and subjecting the slurry to sieving treatment by an ultrasonic vibration sieving apparatus.

Further, present invention provides an ultrasonic vibration sieving apparatus comprising a sieving machine body provided with a supply pipe and a discharge pipe for a material to be sieved, a sieving chamber provided within the sieving machine body and provided with a withdrawal pipe for a sieved material, a filter layer constituting a part of the surface of the sieving chamber and rotatably supported, an ultrasonic oscillation tip adapted to face only a part of the surface of the filter layer at one time and to face the entire surface of the filter layer as the filter layer rotates, and a tip chamber provided above the sieving machine body to permit the ultrasonic oscillation tip to enter into the sieving machine body.

DETAILED DESCRIPTION OF THE PREFERRED EMBODIMENTS

Figure 1:
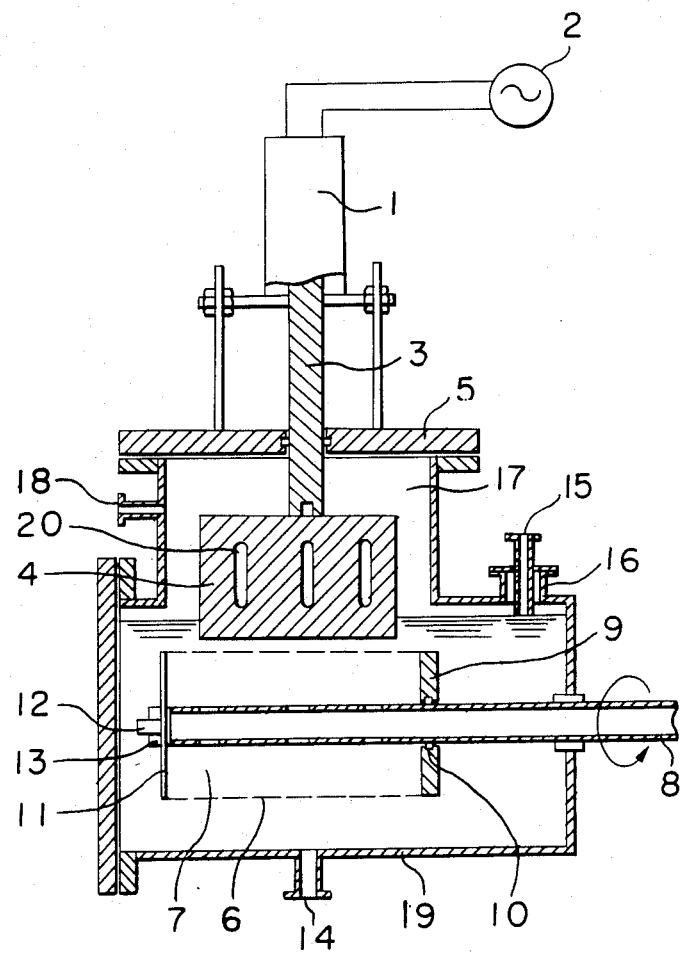
FIG. 1 is a diagrammatic view of the vertical cross-section, along the rotary axis of the filter layer, of an ultrasonic vibration sieving apparatus to be used in the present invention.

Firstly, as the source of solid impurities contained in carbon black, there may be mentioned coke particles formed in the furnace at the same time as the formation of carbon black, fragments fallen off from the bricks of the furnace, or iron powders from the apparatus such as heat exchangers, or there may be mentioned metal salts of alkali metal or alkaline earth metal type contained in the starting material oil, in the additives or in water supplied to the furnace during the production of carbon black.

As the carbon black to be used in the present invention, there may be mentioned a variety of known products such as a coloring pigment produced by a furnace method, carbon black for the reinforcement of rubber or carbon black having electric conductivity, or by-product carbon black (carbon black produced as a by-product during the production of carbon monoxide gas and hydrogen gas by partial oxidation of a hydrocarbon such as heavy oil or ethylene bottom oil in the presence of oxygen and steam).

As the carbon black for coloring pigment, there may be mentioned, for instance, Mitsubishi Carbon Black (trademark of Mitsubishi Chemical Industries, Co. Ltd.) #2400B, #2300, #2200B, #1000, #900, MCF-88, MA-600, MA-100, MA-8, MA-11, #50, #52, #55, #40, #45, #30, #32 or #33.

As the carbon black for rubber, there may be mentioned, for instance, Diablack (trademark of Mitsubishi Chemical Industries, Co. Ltd.) A, LI, I, II, N339, LH, H, SH, HA, SF or G. As the conductive carbon black, there may be mentioned, for instance, Ketjen Black EC (trademark of Aczo Chemie, Netherlands), Vulcan XC-72, Black Pearls 1300 or Black Pearls 2000 (trademark of Cabot Co., U.S.A).

The present invention is concerned with the purification of a variety of carbon blacks which contain solid impurities derived from the above-mentioned various sources. Specifically, the purification is conducted by uniformly suspending carbon black in water to obtain a carbon black aqueous slurry, and treating the aqueous slurry by an ultrasonic vibration sieving apparatus.

In the step of obtaining the carbon black aqueous slurry, the amount of carbon black added to the water is usually from 1 to 10% by weight as the concentration of carbon black. However, in general, the carbon black aqueous slurry has a different viscosity depending upon the type or the dispersibility of the carbon black even when the amount of carbon black is the same. Therefore, from the practical aspect of the operation, the amount of carbon black is preferably determined on the basis of the viscosity.

The viscosity of the aqueous slurry of carbon black to be supplied to the sieving step by the ultrasonic vibration sieving apparatus, is selected within a range in which no clogging of sieve openings is taken place, and the efficiency of the step is maintained. In general, the viscosity is selected preferably within the range of from 0.1 to 50 poise, more preferably from 0.1 to 20 poise.

In some cases, it may be difficult to obtain a uniform dispersion if it is attempted to prepare an aqueous slurry having such a viscosity directly from carbon black and water. In the present invention, it is preferred to employ a two step preparation method which comprises a first step of preparing a highly concentrated carbon black aqueous slurry having a viscosity of from 1 to 100 poise, more preferably from 25 to 100 poise, and a second step of diluting the highly concentrated slurry with water to obtain a slurry having the above-mentioned low viscosity.

It is desirable to conduct proper mixing or stirring to ensure uniform dispersion of the aqueous slurry. For instance, such mixing and stirring may be conducted by an apparatus where the collision or agitation is repeated in the piping line. However, particularly when the viscosity is high, it is preferred to employ a stirrer provided with rotary vanes in a continuous or batch system.

Water of a high purity is used as the water for the preparation of the slurry and as the water for dilution. However, it is further preferred to use an acidic water having a pH of from 1 to 6 by an addition of a readily volatile acid such as nitric acid or carbon dioxide, whereby the removal of solid impurities will be facilitated.

Then, the carbon black aqueous slurry obtained by the above step is treated by an ultrasonic vibration sieving apparatus. As such an ultrasonic vibration sieving apparatus, there may be employed an apparatus wherein the filter layer is rotatable, or the filter layer is fixed.

Now, the ultrasonic vibration sieving apparatus to be used in the present invention will be described in further detail with reference to the drawings.

FIG. 1 is a diagrammatic view of the vertical cross-section of an ultrasonic vibration sieving apparatus. In the Figure, reference numeral 1 is an ultrasonic wave-generating apparatus driven by an ultrasonic oscillator 2. The vibrations generated by the ultrasonic wave-generating apparatus 1 is transmitted, via an oscillation horn 3, to an oscillation tip 4, the horn 3 extends through a flange 5 above the sieving device, and sealed by an O-ring so that the distance between the ultrasonic oscillation surface (i.e. the lower end surface) of the oscillation tip 4 and the filter layer 6 can be adjusted. A sieving chamber 7 is defined by a cylindrical filter layer 6 and filter side plates 9 and 11 made of a liquid impermeable material and forming the side walls at both ends of the cylindrical filter layer. The filter layer 6 is rotatably supported on a rotary withdrawal pipe 8 for the sieved carbon black slurry, by means of the filter side plates. One of the side plates, i.e. the side plate 9, is freely supported on the withdrawal pipe 8 for the sieved slurry, by means of an O-ring. The other filter side plate 11 is secured to the withdrawal pipe 8 by a bolt 12 and a nut 13 provided at the end surface of the withdrawal pipe 8. The withdrawal pipe 8 is provided, inbetween the filter side plates 9 and 11, with a suitable number of through-holes, which serve to lead the sieved carbon black aqueous slurry to the interior of the withdrawal pipe 8.

A carbon black aqueous slurry to be sieved is supplied from a supply pipe 14 into the sieving machine. The sieved slurry which has passed through the filter layer 6 is discharged from the withdrawal pipe 8, and the non-sieved slurry which has not passed through the filter layer 6, is discharged from a discharge pipe 15. This discharge pipe 15 is preferably inserted through and secured to an opening portion 16 provided on the sieving machine body. The liquid level in the sieving machine may be varied by changing the degree of the insertion of the discharge pipe 15, i.e. by changing the position of the open end of the discharge pipe 15.

Reference numeral 17 indicates a tip chamber located above the sieving machine body and adapted to permit the ultrasonic oscillation tip 4 to enter into the sieving machine body. This tip chamber is preferably a gas chamber filled with a gas. In such a case, a gas is introduced into the tip chamber 17, i.e. into the sieving machine, from a gas supply pipe 18. An excess amount of the gas supplied into the sieving machine, is discharged together with the non-treated slurry from the discharge pipe 15 out of the machine.

Figure 2:
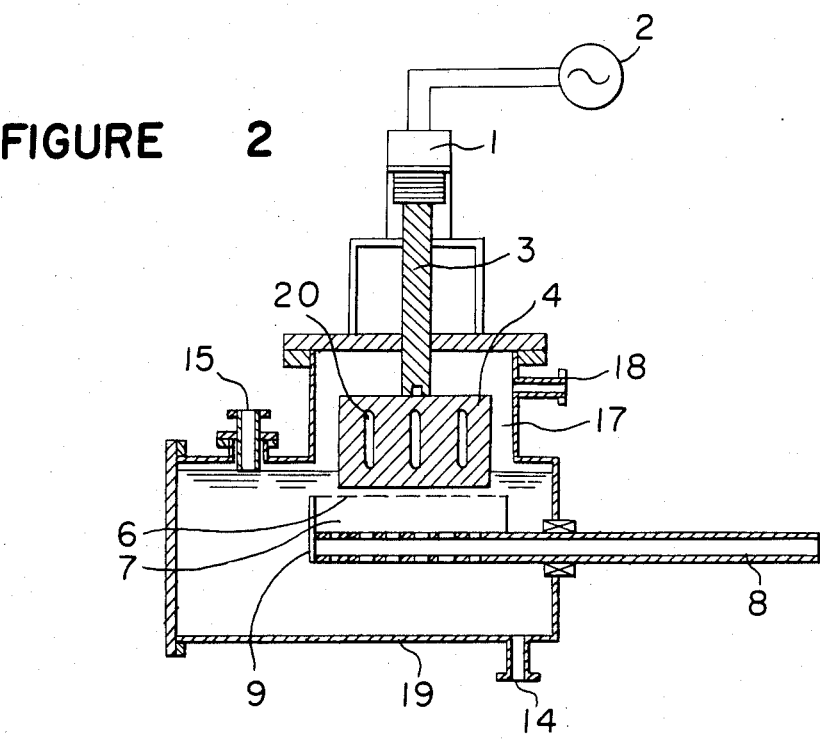
FIG. 2 is a diagrammatic view of the vertical cross-section of an ultrasonic vibration sieving apparatus with a fixed filter layer.

FIG. 2 is a diagrammatic view of the vertical cross-section of an ultrasonic vibration sieving apparatus wherein the filter layer is fixed. The carbon black aqueous slurry is subjected to sieving treatment in the same manner as in the case of the ultrasonic vibration sieving apparatus of FIG. 1 wherein the filter layer is rotary.

The choice of either one of the two systems, i.e. the system wherein the filter layer is rotary, or the system wherein the filter layer is fixed, may be made depending upon the particular application. However, for the continuous operation for an extended period of time, it is preferred to employ the system wherein the filter layer is rotary. Namely, the application of ultrasonic waves serves to disperse carbon black in the aqueous slurry. However, at the same time, the filter layer is also affected by the ultrasonic waves, and tends to wear off due to an erosion phenomenon, whereby finally holes will be formed in the filter layer.

The degree of wearing off of the filter material due to the erosion phenomenon varies depending upon various factors and may vary particularly depending on the overall period of time of the irradiation of ultrasonic waves applied to the same position of the filter layer. Namely, the useful life of the filter layer is determined by the overall period of time of the ultrasonic irradiation to the same position of the filter layer. When the overall time of the ultrasonic irradiation applied to the same position of the filter layer is the same, the larger the surface area of the filter layer exposed to the ultrasonic waves (hereinafter referred to as "effective exposure surface area") is, the longer the useful life of the filter material becomes. For this purpose, it is conceivable to employ a method wherein the surface area of the filter material is made as large as possible and the ultrasonic oscillation surface is moved thereover. However, such a method has a disadvantage that the structure will be complicated. Therefore, it is more advantageous to move the filter layer. As a method for moving the filter material, it is possible to employ a method of moving the material in a flat plane. However, it is most simple and efficient to rotate the filter layer about the center axis so that the effective exposure surface of the filter layer is moved relative to the ultrasonic oscillation tip surface, as in the present invention. Thus, it is preferred to employ a system wherein the filter layer is rotary.

As the shape of the filter layer which is rotated about the center axis to receive the ultrasonic waves substantially equally, a cylindrical shape, an angular tubular shape or a disc shape is preferred.

Thus, the exposure of the filter layer to the ultrasonic waves becomes non-continuous, and it is expected that the useful life is prolonged more than the simple calculation based on the irradiation period of time, since it is possible to prevent the possibility that when the filter material is continuously exposed to the ultrasonic waves, the exposed portion of the filter material tends to have a high temperature whereby the deterioration of the material is facilitated. In this connection, it is better to increase the rotational speed as far as possible so long as the useful life of the filter layer is concerned. However, in order to adequately disperse carbon black pressed against the filter material by the irradiation of the ultrasonic waves, it is required to continuously apply the ultrasonic waves at least for a certain period of time. According to the study of the present invention, the time for continuous exposure of the filter layer to the ultrasonic waves is preferably selected within a range of from 0.02 to 2 seconds for a proper balance of the efficiency of the treatment and the useful life of the filter material. Thus, the rotational speed of the filter layer is calculated and selected based on the period of time of the continuous exposure to the ultrasonic waves depending upon the shape of the filter layer.

The most preferred sieving chamber may be provided by a cylindrical rotary body, where the cylindrical portion constitutes the filter layer and each end surface is made of a liquid impermeable material, and the center axis of rotation or its internal double walled pipe is made a withdrawal pipe for the sieved material.

Further, in the ultrasonic vibration sieving apparatus of the present invention, a tip chamber is provided above the sieving machine body so that the ultrasonic oscillation tip is permitted to enter the sieving machine body. This tip chamber is preferably a gas chamber filled with a gas. This is because the load resistance is smaller in the case of the gas as compared with the case where the medium with which the ultrasonic oscillation tip is in contact is a liquid, and it is intended not to let the ultrasonic oscillation tip to contact the liquid except for the portion contributing to the dispersion of the carbon black. Further, the gas to be filled in the tip chamber is a compressed gas such as air. Accordingly, it is preferred to provide a liquid level controlling mechanism so that even if a liquid level modifying factor is created in the sieving machine such as a change of the up-stream pressure in the sieving machine, the liquid level, particularly the liquid level in the gas chamber will not change. As such a controlling mechanism, the most simple system may be such that the discharge pipe for the aqueous slurry is open at a height corresponding to the desired liquid level in the sieving machine, and a gas supply pipe is provided to supply a gas to the gas chamber. In this case, when the predetermined liquid level in the sieving machine body is to be changed, the degree of the insertion of the discharge tube for the aqueous slurry into the sieving machine body, i.e. the position of the opening of the discharge tube, may be changed. Any other liquid level controlling mechanism may likewise be employed so long as such a mechanism does not adversely affect the sieving or filtering operation of the present invention.

Now, referring to the ultrasonic oscillation tip, by the nature of ultrasonic waves, if the length of one side of the ultrasonic oscillation tip exceeds ¼ of the wave length of the vibration of the material constituting the ultrasonic oscillation tip, abnormal vibrations are likely to take place at the ultrasonic oscillation tip. In order to avoid such abnormal vibrations, it is preferred to provide slits to the ultrasonic oscillation tip. The upper and lower surface of the slits provided to the ultrasonic oscillation tip, also constitutes an ultrasonic oscillation surface, and therefore the longer the length of one side of the ultrasonic oscillation tip is, the greater the ultrasonic energy not effectively used for the sieving operation becomes. In the case where slits are provided to the ultrasonic oscillation tip, it is possible to minimize the ultrasonic energy not effectively used for the sieving operation, if the liquid level control position is located between the lower end surface of the ultrasonic oscillation tip and the lower end surface of the slits provided to the ultrasonic oscillation tip.

The ultrasonic energy generated by the ultrasonic wave generating apparatus is limited by the limitation of the performance of the ultrasonic oscillation tip. Therefore, heretofore, it has been difficult to scale up the ultrasonic vibration sieving apparatus. It is noteworthy that according to the present invention, it is now possible to prepare a large scale ultrasonic vibration sieving apparatus.

In the foregoing, the invention was described with respect to the sieving machine provided with an ultrasonic oscillation tip having a rectangular shape. However, the present invention can effectively be applied also to a sieving machine provided with an oscillation tip having a cylindrical shape, wherein the diameter of the upper end surface of the ultrasonic oscillation tip is greater than the diameter of the lower end surface of the ultrasonic oscillation horn. The apparatus is operated usually at a frequency of at most 1000 KHz, preferably from 10 to 50 KHz, with an amplitude of at most 30 $\mu m$, preferably from 10 to 20 $\mu m$ and at a power density of at least 1 W/cm$^2$, preferably from 10 to 150 W/cm$^2$.

The frequency can be varied by selecting the material for the ultrasonic oscillation tip. The ultrasonic oscillation tip may be made of nickel, ferrite, barium titanate or lead titanate-zirconate. Among these, a proper material is optionally selected depending upon the desired frequency for sieving treatment.

The amplitude may be varied by changing the radiation surface and the length of the oscillation tip and the power density.

The openings of the filter material of the ultrasonic vibration sieve must be small enough to prevent the solid impurities to be removed from passing therethrough and large enough to let the carbon black aqueous slurry pass therethrough. The sieve openings are at most 44 $\mu m$, preferably at most 28 $\mu m$, more preferably at most 12 $\mu m$. The size of the sieve openings is optionally selected depending upon the particle size distribution of the impurities in the starting material carbon black and on the particular use of the carbon black product. The distance between the ultrasonic oscillation tip and the filter layer substantially affects the amount of the slurry which passes through the filter layer. Accordingly, the distance between the ultrasonic oscillation tip and the filter layer is adjusted usually within a range of from 1 to 10 mm, preferably from 2 to 6 mm.

If the distance is large, the irradiated ultrasonic waves attenuate correspondingly, whereby the suspension tends to hardly pass through the sieve openings. On the other hand, if the distance is small, the sieve openings tend to be damaged.

The filtration pressure may vary depending upon the size of the sieve openings and the slurry concentration, and it is usually from 0.2 to 1.0 kg/cm$^2$G, preferably from 0.2 to 0.5 kg/cm$^2$G.

In order to recover carbon black from the sieved slurry from which solid impurities have been removed, an organic solvent is added to the slurry to form two phases of an organic solvent phase and an aqueous phase.

When the mixture is stirred, carbon black is initially present mainly in the aqueous phase, but when the stirring is continued, the carbon black in the aqueous phase will transfer to the organic solvent phase. If the optimum amount of organic solvent is added, carbon black can be obtained in a granular form, whereby there will be an advantage that the handling of the carbon black will be easy. The granulation of carbon black will be difficult if the amount of the solvent is either too large or too small. Therefore, the amount of the solvent is preferably at a level of from 0.8 to 2.0 times by volume the DPB absorption of carbon black (the amount by volume of dibutyl phthalate adsorbed by carbon black) present in the suspension.

As the organic solvent, there may be employed any optional non-aqueous solvent. For instance, there may be mentioned toluene, xylene, benzene, chloroform, hexane or heptane.

Further, the organic solvent added during the recovery step and the remaining moisture are removed. This removal is conducted by heating the carbon black in a stream of an inert gas such as nitrogen gas, carbon dioxide gas or argon gas. As the apparatus for the removal, there may be employed a conventional drying machine such as a disc dryer, a paddle dryer or a rotary kiln. For the heating, there may be employed steam, heating medium or electricity, and the degree of the heating is optionally selected depending upon the rate of removal. Likewise, the degree of the removal is optionally selected depending upon the particular use of the carbon black.

The carbon black with its solid impurities removed by the present invention is capable of improving the commercial value as a functional product, when incorporated into resin or rubber and molded by an extruder, when used for an inflation film or for spinning after the mass-coloring, or when used for the information recording material.

In the foregoing, the invention was described with respect to carbon black. However, particularly with respect to the apparatus, the present invention is applicable not only to carbon black but widely to flocculable fine particles in general such as dyestuffs, pigments or fine particulate silica.

Now, the present invention will be described in further detail with reference to Examples. However, it should be understood that the present invention is by no means restricted to such specific Examples.

EXAMPLES 1 to 3

Carbon black A (DBP absorption: 270 ml/100 g carbon black, particle size: 16 m$\mu$m, nitrogen specific surface area: 1500 m$^2$/g) was mixed to water in an amount of 4% by weight, and the mixture was forcibly stirred to obtain a highly concentrated carbon black aqueous slurry having a viscosity of 50 poise.

Then, the slurry was diluted with water to the slurry concentration as identified in Table 1, and stirred until the slurry reached the equilibrium viscosity at that concentration, whereupon the viscosity was confirmed. Then, the slurry was pressurized by a pump to the filtration pressure as identified in Table 1 and transferred to the ultrasonic vibration sieving apparatus of FIG. 1 set at the oscillation frequency, the oscillation input, and the clearance between the oscillation tip and the filter layer as identified in Table 2, whereby treatment for the removal of the water-insoluble solid impurities was conducted. Then, the amount of the product slurry was measured. To the product slurry, toluene was added as an organic solvent in an amount of 300 ml/100 g carbon black, and the mixture was stirred, whereby the carbon black was transferred to the toluene phase and at the same time granulated.

The toluene-containing granular carbon black thus obtained was separated from water, and then treated preliminarily at a temperature of 200° C. for the recovery of toluene and further at 390° C. for 30 minutes in nitrogen gas to remove the moisture and toluene contained in very small amounts.

Even when the sieving treatment by the ultrasonic vibration sieving apparatus was continued for 1 week, no carbon black remained on the sieve.

With respect to the carbon blacks thus obtained, the coarse particle contents and the alkaline earth metal contents were measured. The results thereby obtained are shown in Table 1.

COMPARATIVE EXAMPLE 1

A carbon black aqueous slurry as used in Example 1 was subjected to mechanical vibration sieving treatment at a frequency of vibrations of 1750 times/min. by means of a vibration sieving apparatus having a sieve diameter of 50 cm and a sieve opening of 500 mesh. As a result, carbon black remaining on the sieve gradually increased. Upon the expiration of 2 hours after the initiation of the sieving treatment, the amount of the product carbon black passed through the sieve became about a half of the total amount of carbon black supplied.

For further information, the physical properties of carbon black A in the non-treated state as used in Examples 1 to 3 are also presented in Table 1.

EXAMPLES 4 TO 7

Carbon black B (DBP absorption: 45 mg/100 g carbon black, particle size: 20 m$\mu$m, nitrogen specific surface area: 110 m$^2$/g) was mixed to water in an amount of 18% by weight, and the mixture was treated in the same manner as in Examples 1 to 3 to obtain a highly concentrated carbon black aqueous slurry.

Then, the aqueous slurry was diluted with water to the slurry concentration as identified in Table 1, and stirred until the slurry reached the equilibrium viscosity at that concentration, whereupon the viscosity was measured. Then, the slurry was pressurized by a pump to the filtration pressure as identified in Table 2, and then subjected to the sieving treatment with the ultrasonic vibration sieve under the same conditions as in Examples 1 to 3.

To the product slurry thereby obtained, hexane was added in an amount of 100 ml/100 g carbon black, and the mixture was stirred, whereby the carbon black was transferred to the hexane phase and at the same time granulated.

The hexane-containing granular carbon black thereby obtained was separated from water, and dried at 180° C. in a steam dryer for about 5 hours.

Even when the sieving treatment by the ultrasonic vibration sieving apparatus was continued for 1 week, no carbon black remained on the sieve.

With respect to the carbon blacks thus obtained, the coarse particle contents were measured. The results thereby obtained are shown in Table 1.

COMPARATIVE EXAMPLE 2

A carbon black aqueous slurry as used in Example 4 was subjected to the mechanical sieving treatment under the same conditions as in Comparative Example 1 instead of the sieving treatment by the ultrasonic vibration sieve. As a result, upon the expiration of 3 hours after the initiation of the sieving treatment, the amount of the product carbon black became about a half of the total amount of the carbon black supplied.

For further information, the physical properties of carbon black B in the non-treated state as used in Examples 4 to 7 are also presented in Table 1.

EXAMPLE 8

By using the ultrasonic vibration sieving apparatus as shown in FIG. 1 wherein the maintenance chamber was a gas chamber, sieving treatment was conducted at the slurry concentration, filtration pressure and various distances between the lower end surface of the ultrasonic oscillation tip and the filter layer as identified in Table 3, while supplying an aqueous slurry of carbon black from the supply tube 14 for the material to be sieved, at a rate of about 5 m$^3$/hr, whereby the carbon slurry withdrawn from the withdrawal pipe 8 for the treated material was recovered and the amount was measured. The results of the measurement are shown in Table 3.

REFERENCE EXAMPLE

Figure 3:
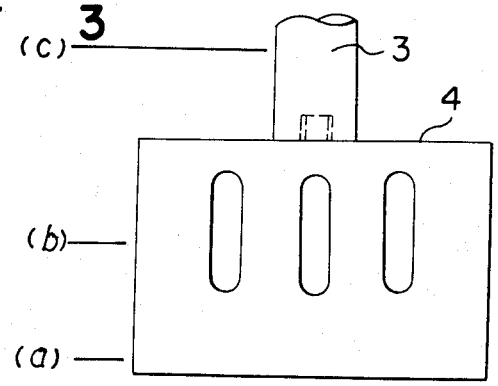
FIG. 3 is an enlarged front view of the ultrasonic oscillation tip shown in FIGS. 1 or 2.

By using the ultrasonic oscillation tip as shown in FIG. 3, the apparatus as shown in FIG. 2 was operated at an ultrasonic oscillation frequency of 19 KHz with an ultrasonic oscillation amplitude of 20 $\mu$m and by using water as the liquid filled in the sieving device, whereby the electric power consumed by the ultrasonic wave generating apparatus was measured to see the influence of the pressure in the sieving device and the liquid level (as measured at a level of (a), (b) and (c) as shown in FIG. 3) thereover.

The physical properties referred to in the present invention were measured by the following methods.

DBP absorption: JIS K-6221-A method

Sieve residue: JIS K-6221-1970 method A for the measurement of sieve residue

Amount of calcium: 2.0 g of carbon black was weighed, boiled in 50 ml of 6N HCl for 30 minutes, and cooled to room temperature. The mixture was filtered with 5A filter paper. The filtrate was adjusted to 100 ml, and the amount of calcium was measured by an atomic absorption analysis.

Nitrogen specific surface area: BET method

TABLE 1

| | Carbon black aqueous slurry | | Sieving | | | Solid impurities | |
|---|---|---|---|---|---|---|---|
| | Carbon black concentration (wt. %) | Viscosity (poise) | Filtering pressure (kg/cm²G) | Amount of product slurry (Nm³/hr) | Amount of product carbon black (kg/hr) | JIS 325 mesh sieve residue (wt. %) | Amount of calcium (ppm) |
| Example 1 | 0.5 | 1 | 0.5 | 3.5 | 17.5 | Not detected | 5.1 |
| Example 2 | 1.0 | 15 | 0.5 | 3.6 | 36.0 | " | 74 |
| Example 3 | 3.0 | 40 | 0.5 | 3.0 | 90.0 | " | 218 |
| Example 4 | 2.5 | 5 | 0.2 | 0.8 | 20.0 | " | — |
| Example 5 | 5.0 | 11 | 0.2 | 0.3 | 15.0 | " | — |
| Example 6 | 10.0 | 24 | 0.2 | 0.15 | 15.0 | " | — |
| Example 7 | 15.0 | 35 | 0.2 | 0.08 | 12.0 | " | — |
| Comparative Example 1 | — | — | — | — | — | 0.0013 | 3820 |
| Comparative Example 2 | — | — | — | — | — | 0.030 | — |

TABLE 2

| Specification of ultrasonic vibration sieving apparatus | |
|---|---|
| Frequency (KHz) | 19.5 |
| Amplitude (μm) | 20.0 |
| Oscillation surface area (cm²) | 20.0 |
| Oscillation input (watt/cm²) | 30.0 |
| Clearance between oscillation tip and filter layer (mm) | 3.0 |
| Diameter of cylindrical filter layer (mm) | 150.0 |
| Circumferential speed of cylindrical filter layer (cm/sec) | 10.0 |
| Openings of filter layer (μm) | 10.0 |

TABLE 3

| Test Nos. | Filtering pressure (kg/cm² G) | Slurry concentration (wt. %) | Distance between oscillation surface and filter layer (mm) | Amount of filtrate (m³/hr) |
|---|---|---|---|---|
| 1 | 0.5 | 3 | 3 | 0.43 |
| 2 | 0.75 | 3 | 3 | 0.525 |
| 3 | 0.5 | 0.3 | 5 | 0.92 |

TABLE 4

| Filtering pressure (kg/cm² G) | Liquid level | Power consumption (watt) |
|---|---|---|
| 0 | (a) | 260 |
| | (b) | 360 |
| | (c) | 780 |
| 0.5 | (a) | 390 |
| | (b) | 555 |
| | (c) | 1065 |
| 1.0 | (a) | 425 |
| | (b) | 630 |
| | (c) | — |

What is claimed is:

1. A process for purifying carbon black which contains solid impurities by removing the solid impurities therefrom, which process comprises suspending said carbon black uniformly in water to obtain a carbon black aqueous slurry and subjecting the slurry to a sieving treatment with an ultrasonic vibration sieving apparatus, and wherein said ultrasonic vibration sieving apparatus comprises:
   (a) a sieving maching body provided with a supply pipe and a discharge pipe for the carbon black aqueous slurry,
   (b) a sieving chamber provided within the sieving machine body and provided with a withdrawal pipe for a sieved carbon black aqueous slurry,
   (c) a filter layer constituting a part of the surface of the sieving chamber,
   (d) an ultrasonic oscillation tip facing the filter layer surface and being dipped in the carbon black aqueous slurry to be sieved, and
   (e) a tip chamber provided above the sieving machine body to permit the ultrasonic oscillation tip to enter into the sieving machine body; and wherein the the tip chamber is a gas chamber filled with a gas except for the lower portion of the ultrasonic oscillation tip.

2. The process according to claim 1, wherein the carbon black aqueous slurry is obtained by suspending carbon black which contains solid impurities, uniformly in water to obtain a highly concentrated carbon black aqueous slurry and then further diluting the slurry with water.

3. The process according to claim 1, wherein the carbon black aqueous slurry to be subjected to sieving treatment by the ultrasonic vibration sieving apparatus, has a viscosity of from 0.1 to 50 poise.

4. The process according to claim 1, wherein the carbon black aqueous slurry to be subjected to sieving treatment by the ultrasonic vibration sieving apparatus, has a viscosity of from 0.1 to 20 poise.

5. The process according to claim 1, wherein the highly concentrated carbon black aqueous slurry has a viscosity of from 1 to 100 poise.

6. The process according to claim 1, wherein the highly concentrated carbon black aqueous slurry has a viscosity of from 25 to 100 poise.

7. The process according to claim 1, wherein the sieving machine body is provided with a liquid level controlling mechanism to control the liquid level in the gas chamber so that at least the lower end portion of the ultrasonic oscillation tip is dipped in the slurry to be sieved.

8. The process according to claim 1, wherein the gas chamber is provided with a gas supply pipe, and the discharge pipe for the sieved carbon black aqueous slurry is open at a predetermined liquid level in the gas chamber.

9. The process according to claim 1, wherein the lower end surface of the ultrasonic oscillation tip is rectangular in shape.

10. The process according to claim 7, wherein the filter layer is rotatably supported, and the ultrasonic oscillation tip is adapted to face only a part of the surface of the filter layer at one time and to face the entire surface of the filter layer as the filter layer rotates.

11. An ultrasonic vibration sieving apparatus comprising a sieving machine body provided with a supply pipe and a discharge pipe for a material to be sieved, a sieving chamber provided within the sieving machine body and provided with a withdrawal pipe for a sieved material, a filter layer constituting a part of the surface of the sieving chamber and rotatably supported, an ultrasonic oscillation tip adapted to face only a part of the surface of the filter layer at one time and to face the entire surface of the filter layer as the filter layer rotates, and a tip chamber provided above the sieving machine body to permit the ultrasonic oscillation tip to enter into the sieving machine body.

12. The ultrasonic vibration sieving apparatus according to claim 11, wherein the tip chamber is a gas chamber filled with a gas except for the lower portion of the ultrasonic oscillation tip.

13. The ultrasonic vibration sieving apparatus according to claim 12, wherein the sieving machine body is provided with a liquid level controlling mechanism to control the liquid level in the gas chamber so that at least the lower end portion of the ultrasonic oscillation tip is dipped in the slurry to be sieved.

14. The ultrasonic vibration sieving apparatus according to claim 12 wherein the gas chamber is provided with a gas supply pipe, and the discharge pipe for the material to be sieved is open at a predetermined liquid level in the gas chamber.

15. The ultrasonic sieving apparatus according to claim 11, wherein the lower end surface of the ultrasonic oscillation tip is rectangular in shape.

* * * * *